(12) United States Patent
Yoshinaga et al.

(10) Patent No.: US 9,172,307 B2
(45) Date of Patent: Oct. 27, 2015

(54) SWITCHING POWER SOURCE DEVICE AND CONTROL IC WHICH ARE CAPABLE OF PERFORMING CONSTANT POWER CONTROL

(71) Applicant: Sanken Electric Co., Ltd., Niiza-shi, Saitama (JP)

(72) Inventors: Mitsutomo Yoshinaga, Niiza (JP); Toshihiro Nakano, Niiza (JP); Kengo Kimura, Niiza (JP)

(73) Assignee: Sanken Electric Co., Ltd., Niiza-Shi (JP)

( * ) Notice: Subject to any disclaimer, the term of this patent is extended or adjusted under 35 U.S.C. 154(b) by 0 days.

(21) Appl. No.: 14/171,884

(22) Filed: Feb. 4, 2014

(65) Prior Publication Data

US 2014/0233273 A1 Aug. 21, 2014

(30) Foreign Application Priority Data

Feb. 19, 2013 (JP) .................................. 2013-029678

(51) Int. Cl.
| | |
|---|---|
| G05F 1/565 | (2006.01) |
| G05F 1/00 | (2006.01) |
| H02M 3/335 | (2006.01) |
| H02M 7/757 | (2006.01) |
| H05B 33/08 | (2006.01) |
| H02M 1/00 | (2007.01) |

(52) U.S. Cl.
CPC ...... H02M 3/33507 (2013.01); H02M 3/33523 (2013.01); H05B 33/0815 (2013.01); *H02M 2001/0006* (2013.01)

(58) Field of Classification Search
USPC .................. 323/274, 275, 284–287, 300, 303; 363/21.08, 21.11, 21.16, 21.18, 55, 363/56.01, 56.09–56.12, 74, 78, 79, 95, 97, 363/131
See application file for complete search history.

(56) References Cited

U.S. PATENT DOCUMENTS

| | | | | |
|---|---|---|---|---|
| 5,737,209 | A | * | 4/1998 | Stevens ......................... 363/143 |
| 2002/0089860 | A1 | * | 7/2002 | Kashima et al. ................ 363/13 |
| 2002/0159276 | A1 | * | 10/2002 | Deboy et al. .................... 363/20 |
| 2005/0219870 | A1 | * | 10/2005 | Yang et al. ..................... 363/21.01 |
| 2008/0130327 | A1 | * | 6/2008 | Yan et al. ...................... 363/21.16 |
| 2008/0259655 | A1 | * | 10/2008 | Wei et al. ...................... 363/21.18 |
| 2010/0321958 | A1 | * | 12/2010 | Brinlee et al. ................ 363/21.1 |
| 2011/0115403 | A1 | * | 5/2011 | De Smit ........................ 315/291 |
| 2012/0287682 | A1 | * | 11/2012 | Zhang et al. .............. 363/21.16 |

FOREIGN PATENT DOCUMENTS

JP 2006-210836 A 8/2006

\* cited by examiner

*Primary Examiner* — Adolf Berhane
*Assistant Examiner* — Gary Nash
(74) *Attorney, Agent, or Firm* — Marvin A. Motsenbocker; Mots Law, PLLC

(57) ABSTRACT

The present invention is a switching power source device which converts AC power of an AC power source into DC power and outputs the DC power, the device including: a rectifying-smoothing circuit configured to output a rectified-smoothed voltage signal obtained by rectifying and smoothing an AC voltage of the AC power source; a transformer having a primary winding, a secondary winding, and an auxiliary winding; a switching element connected to the primary winding of the transformer; and a control circuit configured to turn the switching element on and off based on a voltage signal which is based on an average value of current flowing through the switching element and the rectified-smoothed voltage signal from the rectifying-smoothing circuit.

3 Claims, 7 Drawing Sheets

FIG. 3

| Vin [V] | NINE LEDs CONNECTED IN SERIES | | | TEN LEDs CONNECTED IN SERIES | | | ELEVEN LEDs CONNECTED IN SERIES | | |
|---|---|---|---|---|---|---|---|---|---|
| | ILED [mA] | VLED [V] | Po [W] | ILED [mA] | VLED [V] | Po [W] | ILED [mA] | VLED [V] | Po [W] |
| 80 | 494 | 31.22 | 15.41 | 449 | 33.89 | 15.22 | 410 | 36.61 | 15.00 |
| 90 | 501 | 31.31 | 15.70 | 455 | 33.97 | 15.45 | 414 | 36.67 | 15.20 |
| 100 | 503 | 31.33 | 15.75 | 456 | 33.97 | 15.47 | 415 | 36.67 | 15.20 |
| 110 | 500 | 31.30 | 15.65 | 453 | 33.93 | 15.36 | 412 | 36.64 | 15.11 |
| 120 | 494 | 31.24 | 15.45 | 448 | 33.87 | 15.17 | 408 | 36.57 | 14.92 |

| Vin [V] | ΔILED | | ΔVLED | | ΔPo | |
|---|---|---|---|---|---|---|
| | min/typ | max/typ | min/typ | max/typ | min/typ | max/typ |
| 80 | 9.9% | -8.7% | -7.9% | 8.0% | 1.3% | -1.4% |
| 90 | 10.2% | -8.9% | -7.8% | 8.0% | 1.6% | -1.7% |
| 100 | 10.4% | -9.0% | -7.8% | 8.0% | 1.8% | -1.7% |
| 110 | 10.4% | -8.9% | -7.8% | 8.0% | 1.8% | -1.7% |
| 120 | 10.4% | -9.0% | -7.8% | 8.0% | 1.8% | -1.7% |

SWITCHING POWER SOURCE DEVICE AND CONTROL IC WHICH ARE CAPABLE OF PERFORMING CONSTANT POWER CONTROL

BACKGROUND OF INVENTION

1. Technical Field

The present invention relates to a switching power source device and a control IC for lighting LEDs which are capable of performing constant power control.

2. Background Art

FIG. 1 is a configuration block diagram showing a conventional LED lighting device described in Japanese Patent Application Publication No. 2006-210836. In FIG. 1, an EMI filter 1 is connected between both terminals of an AC power source AC, and an output terminal of the EMI filter 1 is connected to an input terminal of a full-wave rectifying circuit DB configured to rectify an AC voltage of the AC power source AC. An output terminal of the full-wave rectifying circuit DB is connected to a capacitor Cin. The full-wave rectifying circuit DB and the capacitor Cin form an input-side rectifying-smoothing circuit. A stage subsequent to the capacitor Cin is formed by a flyback converter having a transformer TR, a switching element Q1, a control integrated circuit (IC) 10, and an LED-group load device 3.

The transformer TR has a primary winding W1, a secondary winding W2, and an auxiliary winding W3. The secondary winding W2 and the auxiliary winding W3 are wound to have reversed phase compared to that of the primary winding W1. The switching element Q1 is formed with a MOSFET, and is connected to the primary winding W1 of the transformer TR and driven by the control IC 10 configured to generate an on/off drive signal.

An output-side rectifying-smoothing circuit formed by a series circuit of a diode D1 and a capacitor C1 is connected between both ends of the secondary winding W2 of the transformer TR, and the LED-group load device 3 having series-connected LED1 to LEDn is connected between both terminals of the capacitor C1. A rectifying-smoothing circuit formed with a series circuit of a diode D2 and a capacitor C2 is connected between both ends of the auxiliary winding W3 of the transformer TR, and a voltage generated at the capacitor C2 is supplied as a power source voltage Vcc for the control IC 10.

To perform constant current control on a load current flowing through the LED-group load device 3, a constant current circuit (CC circuit) is formed, and a detected load current is inputted, as a feedback signal FB, to a current-control error amplifier (not shown) in the control IC 10 so that the load current may have a predetermined average current value.

However, when the constant current control is performed on currents for LEDs whose forward voltages VF largely vary, power inputted to the LEDs varies, causing variations in the amount of luminous flux among individual lighting devices.

In some cases, to suppress the variations in the amount of luminous flux, constant power control is performed on the LED loads. In the constant power control on the LED loads, a constant current IF is decreased when the forward voltage VF of an LED is high while the constant current IF is increased when the forward voltage VF is low. In this case, a computation of VF×IF=constant needs to be performed by circuitry. For example, VF×IF=constant can be achieved by using a multiplier or the like to generate an FB signal having information for constant power.

When VF×IF=constant is achieved using the multiplier or the like, a single path is formed for the FB signal by placing the multiplier or the like at the secondary side of the transformer TR, but a photo coupler or the like is needed to form an insulating power source. Thus, the circuit configuration becomes complicated. Moreover, it is difficult with a conventional circuit technology to perform the constant power control with a simple circuit other than the multiplier or the like.

An objective of the present invention is to provide a switching power source device and a control IC which are inexpensive and small and are capable of performing constant power control without a multiplier and a photo coupler and reducing variations in the amount of luminous flux even when the forward voltages VF vary.

SUMMARY OF INVENTION

To overcome the above problem, the present invention provides a switching power source device which converts AC power of an AC power source into DC power and outputs the DC power, the device including: a rectifying-smoothing circuit configured to output a rectified-smoothed voltage signal obtained by rectifying and smoothing an AC voltage of the AC power source; a transformer having a primary winding, a secondary winding, and an auxiliary winding; a switching element connected to the primary winding of the transformer; and a control circuit configured to turn the switching element on and off based on a voltage signal which is based on an average value of current flowing through the switching element and the rectified-smoothed voltage signal from the rectifying-smoothing circuit.

BRIEF DESCRIPTION OF DRAWING

FIG. 3 is a diagram showing ILED current values for achieving constant power, for each number of LED loads in the switching power source device of Embodiment 1.

DESCRIPTION OF EMBODIMENTS

Next, switching power source devices according to embodiments of the present invention are described with reference to the drawings. Each switching power source device of the present invention achieves constant power control by using a switching current at a primary side of a transformer as a FB signal to thereby eliminate a constant-power feedback circuit at a secondary side of the transformer. Thus, there can be provided an inexpensive, small switching power source device having small variations in the amount of luminous flux even when forward voltages VF vary, without needing a constant power feedback circuit, a photo coupler, and the like.

Embodiment 1

Figure 2:
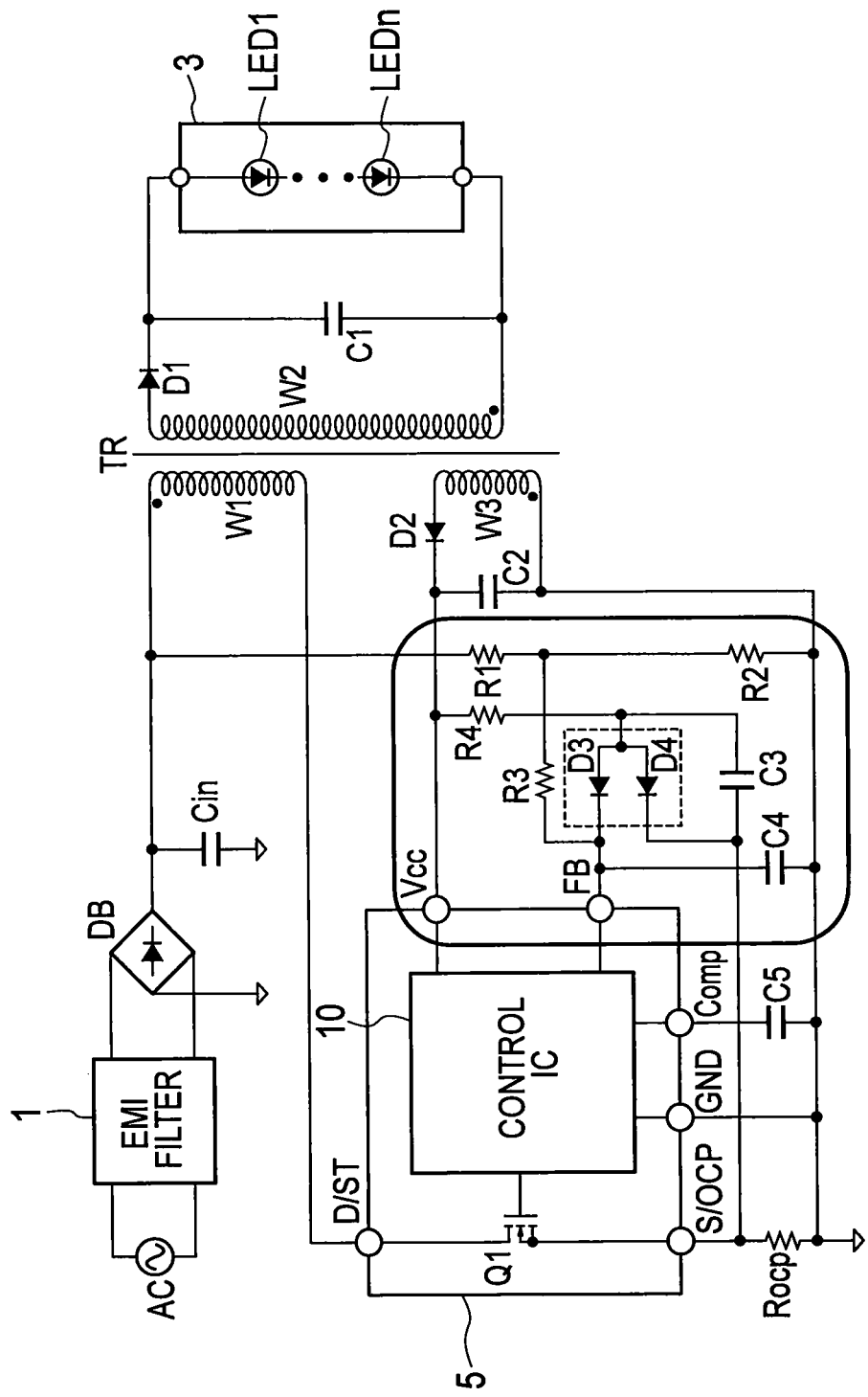
FIG. 2 is a circuit diagram showing the configuration of a switching power source device of Embodiment 1 of the present invention.

FIG. 2 is a circuit diagram showing the configuration of a switching power source device of Embodiment 1 of the present invention. The switching power source device of Embodiment 1 shown in FIG. 2 is applied to an LED lighting device. Note that the switching power source device of Embodiment 1 may also be applied to a device other than the LED lighting device.

Figure 1:
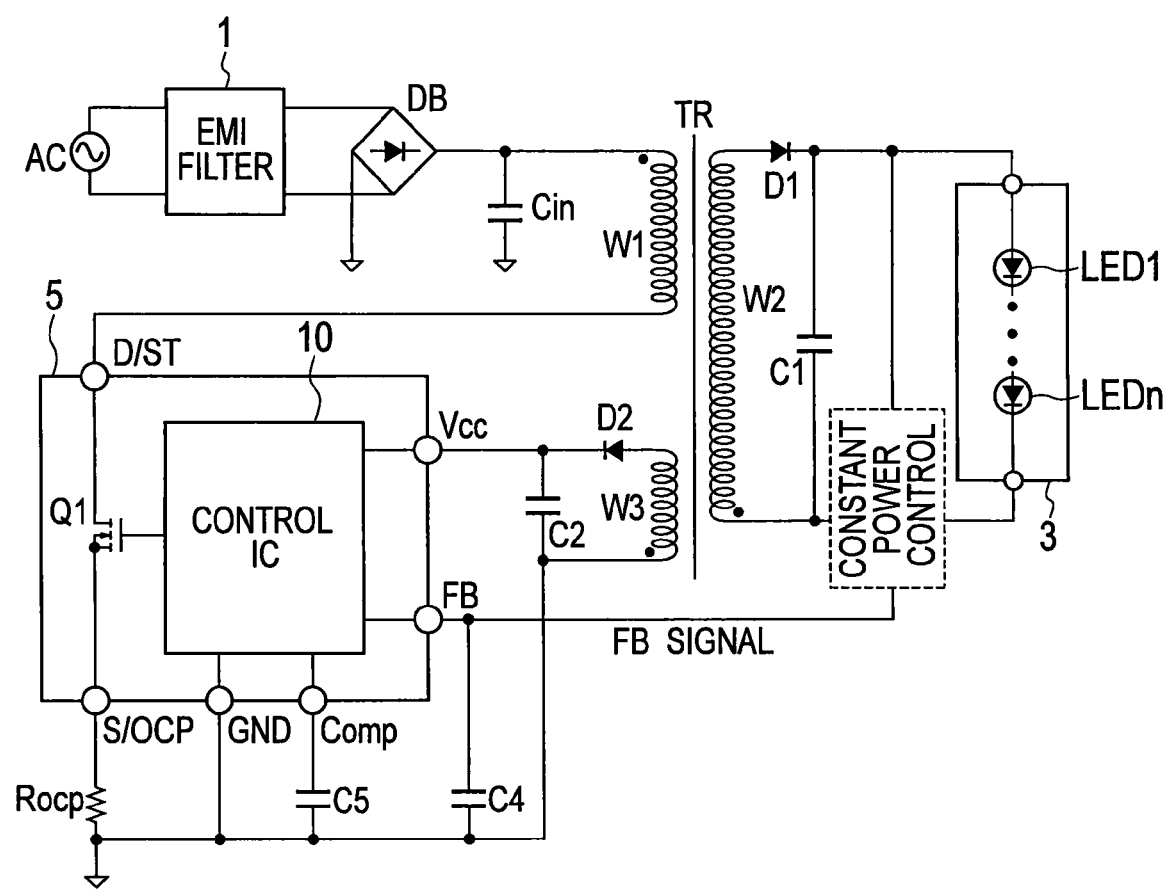
FIG. 1 is a configuration block diagram showing a conventional LED lighting device.

The LED lighting device shown in FIG. 2 is different from that shown in FIG. 1 in that it performs constant power control without the constant power feedback circuit on the secondary side of the transformer TR shown in FIG. 1 but with resistors R1 to R4, diodes D3 and D4, and a capacitor C3 provided additionally.

The resistor R1 is connected at one end to an output terminal of a full-wave rectifying circuit DB, to one terminal of the capacitor Cin, and to one end of a primary winding W1 of a transformer TR, and connected at the other end to one end of the resistor R2 and to one end of the resistor R3. The other end of the resistor R3 is connected to a feedback terminal FB of a control IC 10 and to a cathode of the diode D3.

The other end of the resistor R2 is connected to one terminal of a capacitor C2 and to one end of a resistor Rocp for overcurrent protection (OCP) connected to a source of a switching element Q1. The other end of the resistor Rocp is connected to one end of the capacitor C3 and a cathode of a diode D4. The other end of the capacitor C3 and an anode of the diode D4 are connected to an anode of the diode D3 and one end of the resistor R4.

A cathode of the diode D3 is connected to the other end of the resistor R3 and to the feedback terminal FB of the control IC 10, and the other end of the resistor R4 is connected to a cathode of the diode D2, the other end of the capacitor C2, and a power source terminal Vcc of the control IC 10.

A control circuit 5 has the switching element Q1, the control IC 10, a D/ST terminal, an S/OCP terminal, a GND terminal, a Comp terminal, the FB terminal, and the Vcc terminal.

Other configurations shown in FIG. 2 are the same as those shown in FIG. 1. The same portions are given the same reference numerals, and are not described again here.

Figures 4, 5:
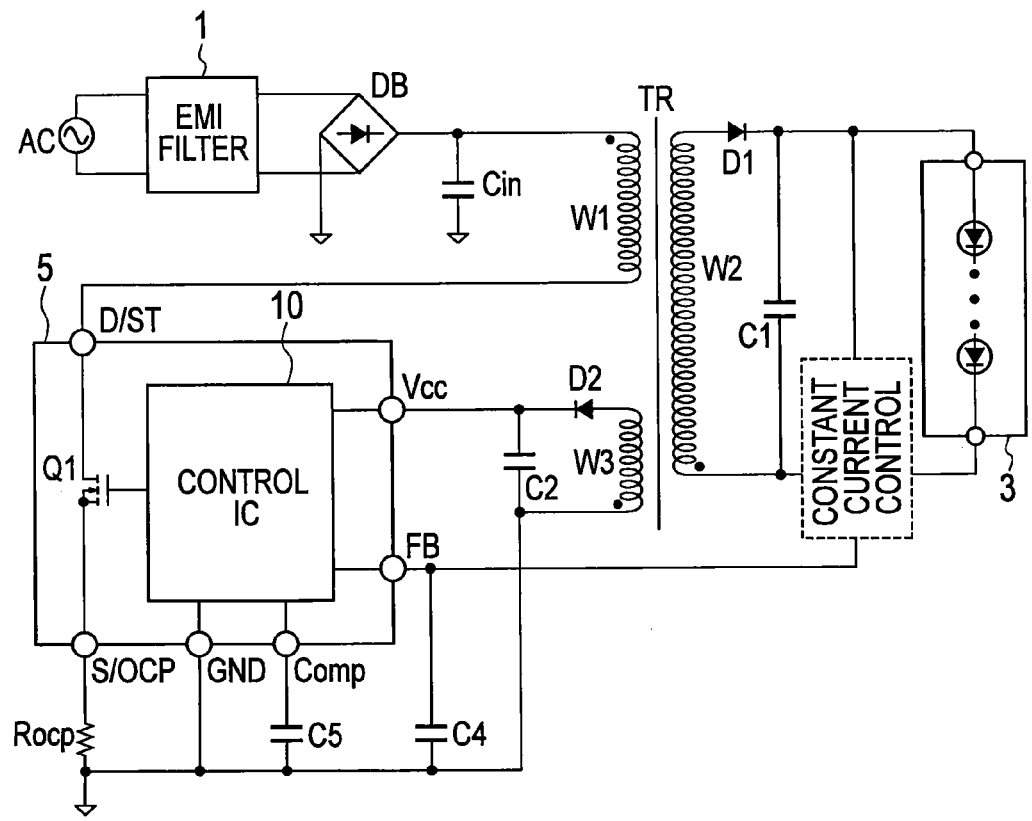
FIG. 4 is a diagram showing errors in current, voltage, and power for each number of LED loads and each input voltage in the switching power source device of Embodiment 1.
FIG. 5 is a circuit diagram showing a configuration of an LED lighting device performing constant current control.
Figure 6:
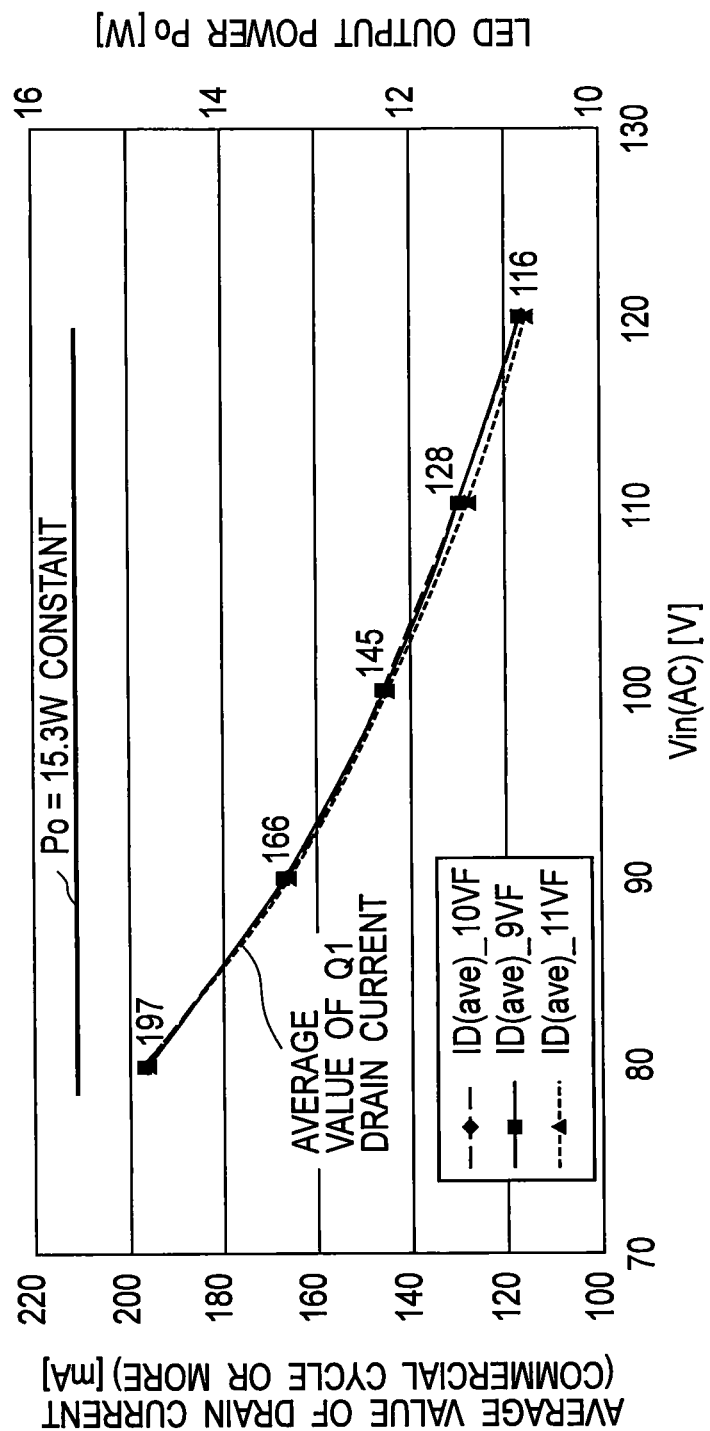
FIG. 6 is a diagram showing an average drain current value for each input voltage, observed when constant power output characteristics are obtained by a current mode PWM method.

Next, before describing operation of the switching power source device of Embodiment 1 shown in FIG. 2, a description is given of an LED lighting device shown in FIG. 5 performing constant current control. The LED lighting device shown in FIG. 5 performing constant current control adjusts a current value so that power inputted to LEDs may be constant even if the LEDs are increased or decreased in number (constant power control). FIG. 6 shows average values of drain current of the switching element Q1 in a case where constant power output characteristics are obtained in a current mode PWM. The average values of drain current shown in FIG. 6 are obtained with an AC input voltage Vin (AC) being changed.

For cases of nine, ten, and eleven LEDs connected in series, when power inputted to the LEDs are made constant (constant power control) by increasing/decreasing a current value, the average values of drain current of the switching element Q1 show almost constant values, as shown in FIG. 6, irrespective of the number of series-connected LEDs.

A curve inversely proportional to the AC input voltage (curve formed by the average values of drain current shown in FIG. 6) is a signal voltage subjected to the constant power control. If the signal voltage is used as a feedback terminal FB signal as it is, the power control performed is proportional to the AC input voltage. Thus, the signal voltage needs to be subjected to some correction. Specifically, a constant FB voltage value can be obtained by superimposing, as an input correction voltage, a signal proportional to a voltage obtained by rectifying and smoothing the AC input voltage, on the average values of drain current shown in FIG. 6. Thus, presumably, the constant power control can be performed using the average values of drain current of the switching element Q1.

A drain current of the switching element Q1 is converted into a voltage by the current detection resistor Rocp and averaged. There is an optimum value for the proportion of that voltage to the FB voltage, and adjustment is needed so that the above-described value obtained by the superimposition of, as the input correction voltage, the signal proportional to the voltage obtained by rectifying and smoothing the AC input voltage may be an optimum value.

For the reasons above, the constant power control can be performed by inputting a value obtained by combining the average values of drain current of the switching element Q1 with the AC input correction voltage into the feedback terminal FB of the control IC 10.

Figure 7:
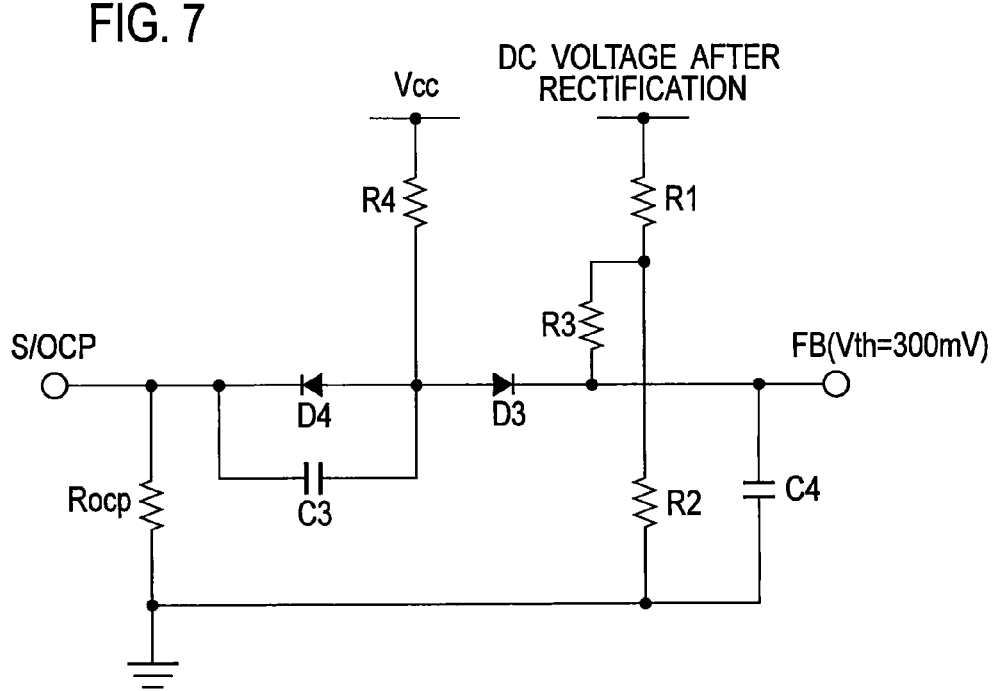
FIG. 7 is a circuit diagram showing a method of extracting and combining an OCP signal in the switching power source device of Embodiment 1.

FIG. 7 shows a method for extracting and combining an OCP signal in the switching power source device of Embodiment 1.

In FIG. 7, the drain current of the switching element Q1 from the S-OCP terminal of the control circuit 5 is converted into voltage information by the resistor Rocp. Then, the high-speed diodes D3 and D4 perform impedance conversion on the FB terminal. In this case, voltage generated between both ends of the resistor Rocp is transmitted to the FB terminal via the diodes D3 and D4. Further, since the diodes D3 and D4 are biased by a Vcc voltage via the resistor R4, the voltage is increased by the diode D4 at the anode thereof by the amount of the forward voltage VF.

A terminal voltage of the anode of the diode D4 is decreased by the diode D3 at the cathode thereof by the amount of the forward voltage VF, and is transmitted after being returned, at the FB terminal, to a voltage level of the resistor Rocp. Further, an AC input correction voltage is applied via the resistor R3 to the cathode of the diode D3, the AC input correction being a DC voltage obtained by rectifying an AC voltage. Specifically, a voltage obtained by combining a voltage corresponding to an average value of drain current of the switching element Q1 with the AC input correction voltage is inputted to the feedback terminal FB of the control IC 10. Thus, the constant power control can be performed.

As described, according to the switching power source device of Embodiment 1, a voltage signal based on the average value of a current flowing through the switching element Q1 and a voltage signal rectified and smoothed by the rectifying-smoothing circuit DB, Cin are inputted to the feedback input terminal FB of the control IC 10. Thus, the feedback voltage value is constant irrespective of the input voltage value, thereby enabling the constant power control. Hence, constant power control can be performed without needing a multiplier and a photo coupler, allowing provision of an inexpensive, small switching power source device causing less change in the amount of luminous flux even when there are variations in the forward voltage VF.

FIG. 3 shows line regulation for each number of LED loads in the switching power source device of Embodiment 1. FIG. 3 shows line regulation for each number of LED loads in a case where a voltage signal based on the average values of current flowing through the switching element Q1 and a voltage signal rectified and smoothed by the rectifying-smoothing circuit DB, Cin are inputted to the feedback input terminal FB of the control IC 10 of the switching power source device of Embodiment 1.

As can be seen in FIG. 3, the smaller the number of LED loads, the smaller a voltage VLED between both ends of each LED but the larger a current ILED flowing through the LED. Then, the larger the number of LED loads, the larger the voltage VLED between both ends of the LED, but the smaller the current ILED flowing through the LED.

FIG. 4 shows how much current, voltage, and power change when the number of LED loads in the switching power source device of Embodiment 1 is changed. As can be seen in FIG. 4, when the number of LED loads increases or decreases, the voltage VLED and the current ILED change in reverse proportion to each other. Thus, the power is constant, and for 10% fluctuations of an LED load factor, change in the power is within ±2%.

Embodiment 2

Figure 8:
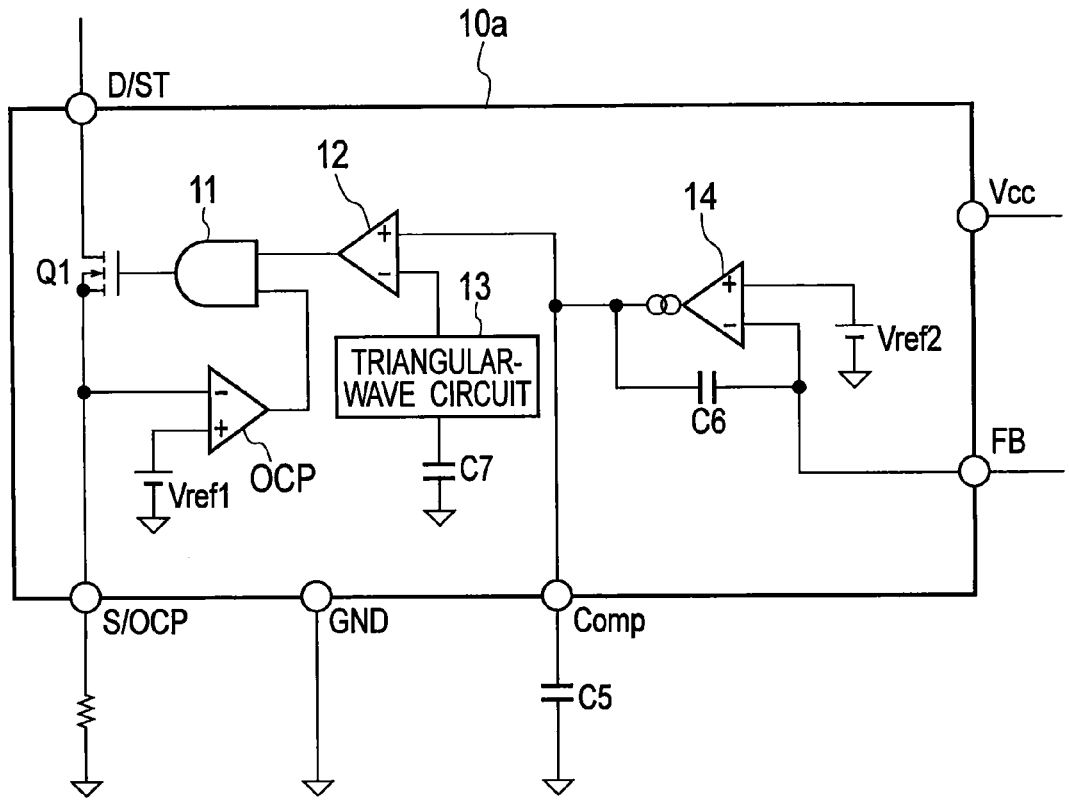
FIG. 8 is a circuit diagram showing the inside of a control IC in a switching power source device of Embodiment 2.

FIG. 8 is a circuit diagram showing the inside of a control IC of a switching power source device of Embodiment 2. A control IC 10a shown in FIG. 8 has a switching element Q1, an AND circuit 11, a PWM comparator 12, a triangular-wave circuit 13, a current-control error amplifier 14, a capacitor C6, and an overcurrent protection circuit OCP.

As an FB signal, a value obtained by combining an S/OCP signal shown in FIG. 7 (an average value of drain current of the switching element Q1) and a DC voltage obtained by AC rectification is inputted to an FB terminal shown in FIG. 8. The current-control error amplifier 14 is configured to amplify an error voltage between the FB signal from the FB terminal and a reference voltage Vref2, and output the amplified error voltage to a non-inverting input terminal of the PWM comparator 12. The PWM comparator 12 is configured to compare a triangular-wave signal from the triangular-wave circuit 13 with the amplified error voltage from the current-control error amplifier 14 and thereby generate a pulse signal for turning the switching element Q1 on and off. This pulse signal changes the ON duration according to the amplified error voltage.

The overcurrent protection circuit OCP is configured to output level L to the AND circuit 11 when a voltage generated by a current flowing through the switching element Q1 exceeds a reference voltage Vref1. The AND circuit 11 is configured to turn the switching element Q1 off in response to level L outputted from the overcurrent protection circuit OCP. The AND circuit 11 turns the switching element Q1 on and off in response to the on/off pulse signal from the PWM comparator 12.

According to the control IC 10a configured as such, a switching element Q1 is provided inside the control IC 10a, and the FB signal obtained by combining an S/OCP signal (an average values of drain current of the switching element Q1) and a DC voltage obtained by AC rectification is inputted to the FB terminal. The control IC 10a can thus be implemented.

Embodiment 3

Figure 9:
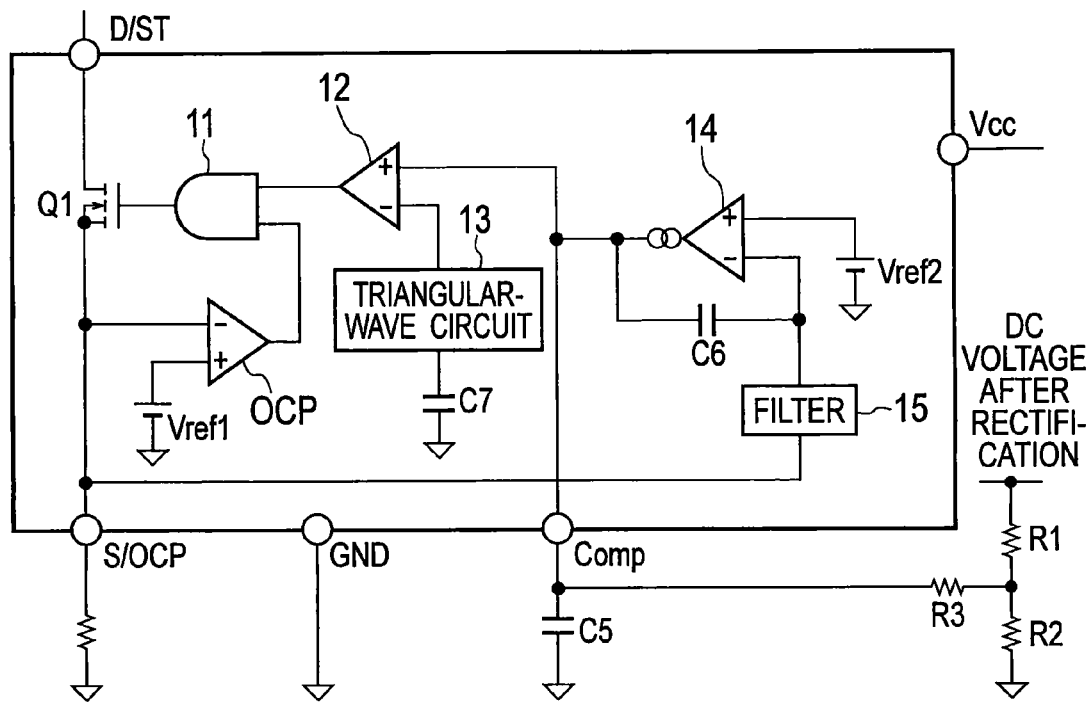
FIG. 9 is a circuit diagram showing the inside of a control IC in a switching power source device of Embodiment 3.

FIG. 9 is a circuit diagram showing the inside of a control IC of a switching power source device of Embodiment 3. The control IC shown in FIG. 9 does not have the FB terminal of the control IC shown in FIG. 8 and configured to input an average value of drain current of the switching element Q1 to an inverting input terminal of a current-control error amplifier 14 via a filter 15 and input a DC voltage obtained by AC rectification to a Comp terminal.

The filter 15 is configured to remove noise contained in a voltage corresponding to an average value of drain current of the switching element Q1 and outputs the voltage to the inverting input terminal of the current-control error amplification 14. The current-control error amplification 14 is configured to amplify an error voltage between the output of the filter 15 and a reference voltage Vref2.

A PWM comparator 12 is configured to generate a pulse signal by comparing a triangular-wave signal from a triangular-wave circuit 13 with an added output obtained by adding the output of the current-control error amplification 14 and the DC voltage obtained by AC rectification sent via the resistor R3 and the Comp terminal.

According to the control IC configured as such, the FB terminal can be eliminated, and also, the diodes D3 and D4, the capacitor C3, and the resistor R4 shown in FIG. 7 can be eliminated. Although the filter 15 is provided in FIG. 9, a source of the switching element Q1 may be directly connected to the inverting input terminal of the current-control error amplification 14 without the filter 15.

Embodiment 4

Figure 10:
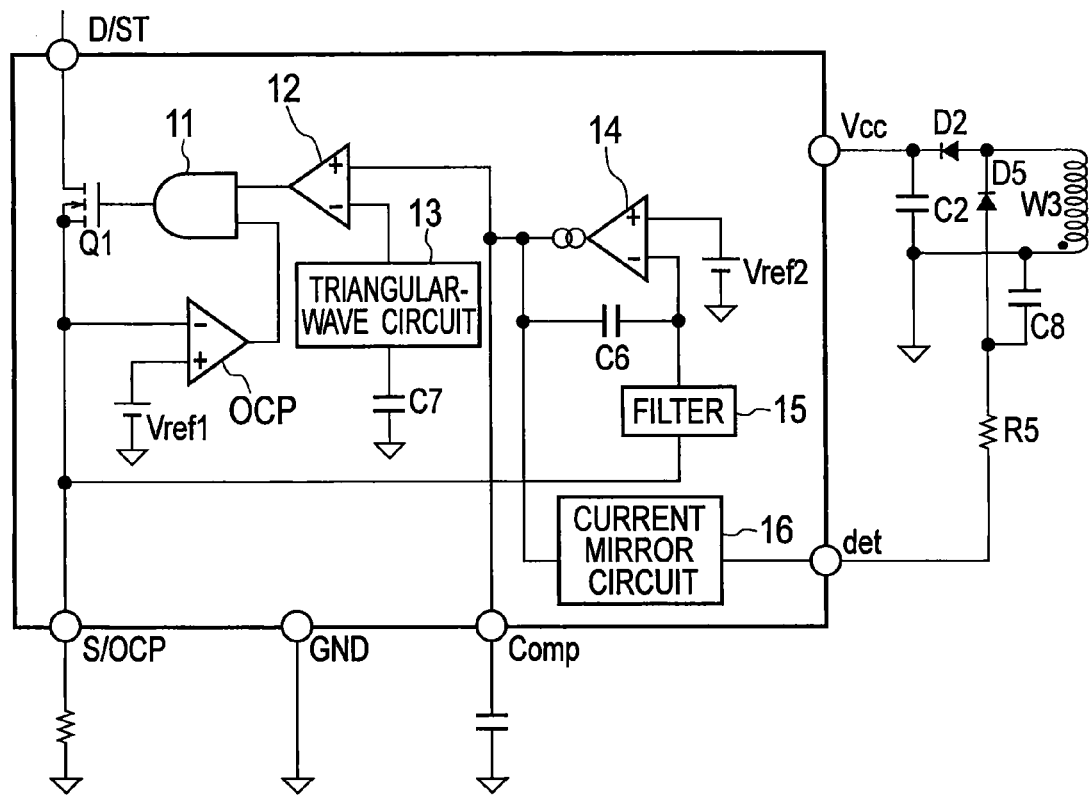
FIG. 10 is a circuit diagram showing the inside of a control IC in a switching power source device of Embodiment 4.

FIG. 10 is a circuit diagram showing the inside of a control IC of a switching power source device of Embodiment 4. The control IC shown in FIG. 10 does not have the resistors R1, R2, and R3 shown in FIG. 9, and is configured such that an average value of drain current of the switching element Q1 is inputted to an inverting input terminal of a current-control error amplifier 14 via a filter 15 and that an output of a Comp terminal is mixed with a forward voltage signal generated from an auxiliary winding W3 via a diode D5 and a capacitor C8 and converted into a current.

A voltage in accordance with a DC voltage obtained by AC rectification is generated at the auxiliary winding W3. The DC voltage of a capacitor C8 generated at the auxiliary winding W3 obtained by the AC rectification and smoothing is outputted to a current mirror circuit 16 via a det terminal. The current mirror circuit 16 converts the voltage of the capacitor C8 inputted via the det terminal into a current and outputs the current to a non-inverting input terminal of a PWM comparator 12.

The PWM comparator 12 is configured to generate a pulse signal by comparing a triangular-wave signal from a triangular-wave circuit 13 with an added output obtained by adding the current from the current mirror circuit 16 which has been converted from the voltage in accordance with the DC voltage obtained by AC rectification and an average value of drain current of the switching element Q1 from the current-control error amplifier 14. Thereby, constant power control can be performed.

According to the present invention, a voltage signal based on the average value of current flowing through the switching element and a voltage signal rectified and smoothed by the rectifying-smoothing circuit are inputted to the control circuit. Hence, the feedback voltage value is constant irrespective of the input voltage value. Constant power control can thus be performed. For this reason, constant power control can be performed without needing a multiplier and a photo coupler, allowing provision of an inexpensive, small switching power source device causing less change in the amount of luminous flux even when the forward voltages VF vary.

What is claimed is:

1. A switching power source device which is capable of performing constant power control, which converts AC power of an AC power source into DC power and outputs the DC power, the device comprising:
    a first rectifying-smoothing circuit configured to output a rectified-smoothed voltage signal obtained by rectifying and smoothing an AC voltage of the AC power source;
    a transformer having a primary winding, a secondary winding, and an auxiliary winding;
    a switching element connected to the primary winding of the transformer; and
    a control circuit configured to turn the switching element on and off based on a voltage signal which is based on an average value of current flowing through the switching element and the rectified-smoothed voltage signal from the first rectifying-smoothing circuit, wherein
    the control circuit has a feedback input terminal determining an on/off duty cycle, and
    the feedback input terminal receives the voltage signal which is based on the average value of current flowing through the switching element and the rectified-smoothed voltage signal from the first rectifying-smoothing circuit, further comprising;
    a current detection resistor series-connected to one of main terminals of the switching element;
    a first resistor connected between an output terminal of the first rectifying-smoothing circuit and the feedback input terminal;
    a first diode and a second diode which are connected in series with opposite orientations between the one of the main terminals of the switching element and the feedback input terminal;
    a second rectifying-smoothing circuit configured to output a rectified-smoothed voltage signal obtained by rectifying and smoothing an AC voltage generated at auxiliary winding of the transformer; and
    a second resister configured to provide a voltage proportional to the rectified-smoothed voltage signal obtained by the second rectifying and smoothing circuit to a connection point between the first diode and the second diode.

2. A switching power source device which is capable of performing constant power control, which converts AC power of an AC power source into DC power and outputs the DC power, the device comprising:
    a rectifying-smoothing circuit configured to output a rectified-smoothed voltage signal obtained by rectifying and smoothing an AC voltage of the AC power source;
    a transformer having a primary winding, a secondary winding, and an auxiliary winding;
    a switching element connected to the primary winding of the transformer; and
    a control circuit configured to turn the switching element on and off based on a voltage signal which is based on an average value of current flowing through the switching element and the rectified-smoothed voltage signal from the rectifying-smoothing circuit, wherein
    the control circuit includes
        an error amplifier configured to amplify an error voltage between a reference voltage and the voltage signal which is based on the average value of current flowing through the switching element, and
        a PWM comparator configured to generate a pulse signal for turning the switching element on and off, by comparing a triangular-wave signal with an added output obtained by adding an output of the error amplifier to a voltage which is generated at the auxiliary winding of the transformer and proportional to the rectified-smoothed voltage signal.

3. A control IC which is capable of performing constant power control comprising:
    a switching element connected to a primary winding of a transformer;
    an error amplifier configured to amplify an error voltage between a reference voltage and a voltage signal which is based on an average value of current flowing through the switching element; and
    a PWM comparator configured to generate a pulse signal for turning the switching element on and off, by comparing a triangular-wave signal with an added output obtained by adding an output of the error amplifier to a voltage which is generated at an auxiliary winding of the transformer and proportional to a rectified-smoothed voltage signal obtained by rectification and smoothing of an AC voltage.

* * * * *